(12) United States Patent
Heikkinen et al.

(10) Patent No.: US 10,754,478 B2
(45) Date of Patent: Aug. 25, 2020

(54) CAPACITIVE DISPLAY DEVICE

(71) Applicant: Microsoft Technology Licensing, LLC, Redmond, WA (US)

(72) Inventors: Marko K. Heikkinen, Tampere (FI); Joni Arola, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/586,269

(22) Filed: May 3, 2017

(65) Prior Publication Data

US 2017/0235427 A1 Aug. 17, 2017

Related U.S. Application Data

(63) Continuation of application No. 14/708,619, filed on May 11, 2015, now Pat. No. 9,671,913.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0418* (2013.01); *G06F 2203/04102* (2013.01); *G06F 2203/04103* (2013.01); *G06F 2203/04106* (2013.01); *G06F 2203/04107* (2013.01)

(58) Field of Classification Search
CPC ...... G06F 3/044; G06F 3/0412; G06F 3/0418; G06F 3/041
See application file for complete search history.

(56) References Cited

U.S. PATENT DOCUMENTS

| | | |
|---|---|---|
| 8,121,283 B2 | 2/2012 | Peng et al. |
| 8,378,993 B2 | 2/2013 | Li et al. |
| 8,564,556 B2 | 10/2013 | Lee et al. |
| 8,629,841 B2 | 1/2014 | Degner et al. |
| 8,633,915 B2 | 1/2014 | Hotelling et al. |
| 8,692,948 B2 | 4/2014 | Park et al. |
| 8,773,387 B2 | 7/2014 | Wallace et al. |
| 8,842,094 B2 | 9/2014 | Hsu et al. |
| 9,671,913 B2 * | 6/2017 | Heikkinen ............ G06F 3/0412 |

(Continued)

FOREIGN PATENT DOCUMENTS

| | | |
|---|---|---|
| CN | 102365698 A | 2/2012 |
| EP | 0706147 A2 | 4/1996 |
| EP | 2674843 A2 | 12/2013 |

OTHER PUBLICATIONS

Gu, et al., "Capacitive Touch Hardware Design Guide", Published on : May 2013, 24 pages, Available at: http://www.ti.com/lit/an/slaa576/slaa576.pdf.

(Continued)

*Primary Examiner* — Kevin M Nguyen

(57) ABSTRACT

A device is described. In an example, a device comprises a capacitance sensor layer and a conductive grounded layer. The conductive grounded layer is placed under the capacitance sensor layer in a direction opposite to a targeted sensing direction of the device. The distance between the capacitance sensor layer and the conductive grounded layer is configured to remain within a threshold over a range of deformation. In other examples, a method for manufacturing a device and a module are discussed along with the features of the device.

20 Claims, 9 Drawing Sheets

(56) References Cited

U.S. PATENT DOCUMENTS

| | | |
|---|---|---|
| 2006/0146033 A1 | 7/2006 | Chen et al. |
| 2009/0067112 A1 | 3/2009 | Takabayashi |
| 2009/0153509 A1 | 6/2009 | Jiang et al. |
| 2009/0194344 A1 | 8/2009 | Harley et al. |
| 2009/0207126 A1* | 8/2009 | Arisato ............ G02F 1/133308 345/102 |
| 2009/0244859 A1* | 10/2009 | Muro ................... H05K 1/0218 361/749 |
| 2011/0012840 A1 | 1/2011 | Hotelling et al. |
| 2011/0102338 A1 | 5/2011 | Liu et al. |
| 2011/0148811 A1* | 6/2011 | Kanehira ............... G06F 3/044 345/174 |
| 2012/0032916 A1 | 2/2012 | Enoki |
| 2012/0075218 A1 | 3/2012 | Lin et al. |
| 2012/0146919 A1 | 6/2012 | Kim et al. |
| 2012/0262898 A1* | 10/2012 | Yamada ............... H05K 9/0039 361/818 |
| 2013/0038211 A1* | 2/2013 | Kang ................ G02F 1/133603 315/113 |
| 2013/0106758 A1 | 5/2013 | Radivojevic et al. |
| 2013/0342495 A1 | 12/2013 | Rappoport |
| 2014/0022185 A1 | 1/2014 | Ribeiro et al. |
| 2014/0078106 A1 | 3/2014 | Yao et al. |
| 2014/0092034 A1* | 4/2014 | Franklin ............ G09F 13/0413 345/173 |
| 2014/0112511 A1 | 4/2014 | Corbin et al. |
| 2014/0198060 A1 | 7/2014 | Wu et al. |
| 2014/0232950 A1 | 8/2014 | Park et al. |
| 2014/0293144 A1* | 10/2014 | Bae ........................ G06F 3/041 349/12 |
| 2015/0002456 A1 | 1/2015 | Yu et al. |
| 2015/0029136 A1 | 1/2015 | Shahparnia |
| 2015/0277626 A1* | 10/2015 | Shinkai ................... G06F 3/044 345/174 |
| 2017/0003778 A1 | 1/2017 | Shepelev |

OTHER PUBLICATIONS

Scott, Barney, "Out-, In- & On-Cell touch technology on display in Shenzhen", Published on: Nov. 25, 2014, 3 pages, Available at: http://www.electronicspecifier.com/displays/out-in-on-cell-touch-technology-on-display-in-shenzhen.

"International Search Report and Written Opinion Issued in PCT Application No. PCT/US2016/027650", dated Oct. 17, 2016, 21 Pages.

"Second Written Opinion Issued in PCT/US2016/027650", dated Mar. 16, 2017, 9 Pages.

"Corrected Notice of Allowance Issued in U.S. Appl. No. 14/708,619", dated May 9, 2017, 2 Pages.

"Final Office Action Issued in U.S. Appl. No. 14/708,619", dated Nov. 22, 2016, 15 pages.

"Non Final Office Action Issued in U.S. Appl. No. 14/708,619", dated Aug. 1, 2016, 12 Pages.

"Notice of Allowance Issued in U.S. Appl. No. 14/708,619", dated Feb. 1, 2017, 5 Pages.

"International Preliminary Report on Patentability Issued in PCT Application No. PCT/US2016/027650", dated Jul. 28, 2017, 11 Pages.

"First Office Action and Search Report Issued in Chinese Patent Application No. 201680027607.6", dated Nov. 28, 2019, 14 Pages.

* cited by examiner

CAPACITIVE DISPLAY DEVICE

RELATED APPLICATIONS

This application claims priority to U.S. application Ser. No. 14/708,619, filed on May 11, 2015, and entitled "CAPACITIVE DISPLAY DEVICE." This application claims the benefit of the above-identified application, and the disclosure of the above-identified application is hereby incorporated by reference in its entirety as if set forth herein in full.

BACKGROUND

A gesture sensitive panel is an input device which allows a user to input a command to a computing device by selecting the indication content displayed on a screen of an image display device by using his or her fingers or other objects or gestures. Herein, a gesture generally refers to physical interaction between a human or an object and a touch sensitive panel. One example of a gesture is touch on a touch sensitive panel. A sensor of the panel may be capacitive, configured to measure capacity between the gesture and the electronics of the sensor.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A device is described. In an example, a device comprises a capacitance sensor layer and a conductive grounded layer. The conductive grounded layer is placed under the capacitance sensor layer in a direction opposite to a targeted sensing direction of the device. The distance between the capacitance sensor layer and the conductive grounded layer is configured to remain within a threshold over a range of deformation.

In other examples, a method for manufacturing a device and a module are discussed along with the features of the device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
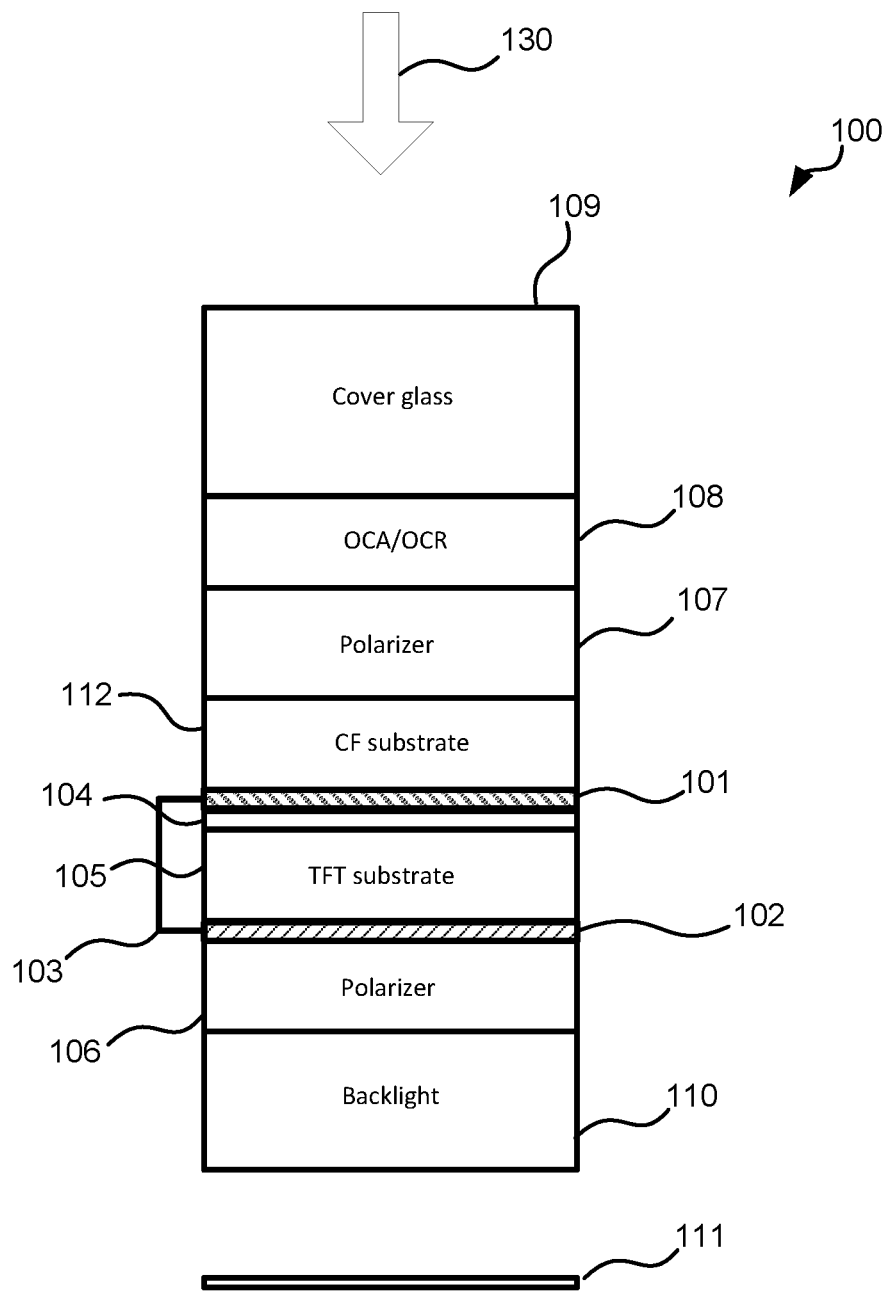
FIG. 1 illustrates a cross section of a schematic representation of a touch sensitive display device according to an illustrative example.

FIG. 1 illustrates an example of a touch sensitive display 100. The display 100 may have a layered configuration, wherein a plurality of layers are superposed on each other to form a stack of layered elements. The display 100 may be configured to display an adjustable visual output to the outside of the display 100. The display 100 may be a stand-alone, operable display, a display module, or a display panel, to be integrated as a part of a device, such as a mobile phone, a smart phone, a table computer, a laptop computer, a game controller, a wearable electronic device, etc.

The display 100 may include sub-elements to generate the text, graphics, and/or images to be displayed. Being based on layers, the display 100 may include layers configured for forming the displayed information. The control for the display 100 may be carried out by elements and components outside the display element. Control signals and power may be supplied to the display element for example by appropriate wirings and cables.

The display 100 may be based on any appropriate electric or electronic display technology, including, for example, LCD, (Liquid Crystal Display), OLED (Organic Light-Emitting Diode), and AMOLED (Active-Matrix Organic Light-Emitting Diode), graphene-based displays, and any of their variants.

The display 100 may be configured so that it can operate as, or as a part of, a passive display element for presenting information one-directionally only, without any interactivity. The display 100 may also be configured as an interactive display, for example being operable by touching it or interacting with it using a stylus. The touch sensitive display 100 may be configured as a gesture based user interface, and it may be based on any appropriate gesture or stylus capacitive sensing technology and their variants.

According to an example, the display 100 may be bendable or foldable. According to another example, the display 100 may be flexible. The errors in the touch sensitive display 100, which are caused by bending or the distance variation of the sensing layer and main grounded layer of the device 100 under the display, may be reduced. The error may be reduced by a conductive grounded layer 102 and a capacitive sensitivity sensor, such as a capacitive sensor 101. For example, the display device 100 may undergo substantial deformation, the degree of which can typically be more than the nominal deformation of any non-bendable or non-flexible material. By having a stable conductive grounded layer 102 it is possible to reduce the sensitivity to the errors and the distance variation between the capacitive sensor 101 and a ground point.

The layers of the display 100 of FIG. 1 are merely examples of possible elements. The touch sensitive display 100 may comprise any appropriate number of elements, as long as the elements include at least one capacitive sensor 101 with a respective grounding layer 102, and at least one display element.

The touch sensitive display 100 includes a stack of layers as illustrated in the example of FIG. 1. As illustrated in FIG. 1, the layered elements of the display 100 are layered in the sense that they lie on top of each other, thereby forming a stack of elements. These elements could also be referred to as layers. Each of the elements or layers is formed as a generally sheet-like or plate-like structure having a width substantially greater than the thickness in a direction perpendicular to the direction in which the width is defined, i.e. in a "perpendicular" or "vertical" direction. In practice, the width, or more generally the lateral dimensions, may be, e.g., in the range of some centimeters to some tens of centimeters, whereas the thickness of each element may be, e.g., some tens of micrometers. However, these numbers are merely exemplary and the thicknesses of the display elements of the display 100 may vary.

The layers of the touch sensitive display 100 may include a cover glass 109, an optically clear adhesive (OCA) or an optically clear resin (OCR) 108, a polarizer 107, a color filter substrate or an encapsulation substrate 112, a capacitance sensor 101, a thin film transistor (TFT) glass 104, a TFT substrate 105, a conductive grounded layer 102, a polarizer 106, and a backlight 110. The touch sensitive display device also includes a part of a main ground 111 of the device. The main ground 111 may be, for example, a part of a frame of the device. The distance 103 between the capacitance sensor 101 and the grounded layer 102 is illustrated in FIG. 1. According to an example, the capacitance sensor 101 may be positioned on the TFT glass 104. According to another example, the capacitance sensor 101 may be positioned on another substrate, which is not necessarily a glass substrate, for example on an encapsulation substrate or a color-filter substrate.

In the example of FIG. 1, the conductive grounded layer 102 may be placed under the capacitive sensor 101 and to the opposite side of the capacitive sensor 101 with respect to a targeted sensing direction 130. For example, the conductive grounded layer 102 may be placed on the backside of the TFT substrate 105. The distance 103 between the capacitance sensor 101 and the conductive grounded layer 102 may be stable. For example, the distance 103 may remain substantially constant when the capacitive sensor 101 and the conductive grounded layer 102 are being used in the device. The distance 103 may remain stable for example when the capacitive sensor 101 and the conductive grounded layer 102 are displaced. The layers, including the capacitive sensor 101 and the conductive grounded layer 102, may be displaced by a force applied in the targeted sensing direction 130. For example a touch on the touch sensitive display device 100 may displace the layers. For another example, the force may be directed from below of the touch sensitive display 100 by displacing main ground 111 towards the sensing layer 102. Both layers 101,102 may in this case be displaced simultaneously so that the distance 103 remains generally constant. The capacitive sensor 101 can have a capacitive connection via the conductive grounded layer 102, instead of having a capacitive connection directly to the closest grounded object, for example to a part of the main ground 111. For example, the sensitivity of the capacity detection to error caused by the bending or the distance variation between the sensor 101 and the ground point, and to other distractions, may thus be reduced. Furthermore, the distance variation of the capacity sensor 101 with respect to the frame of the device and to the conductive grounded layer 102 may be reduced.

According to an example, the conductive grounded layer 102 may be transparent, for example if it is placed between the capacitance sensor 101 and the backlight 110 having illuminating features. The conductive grounded layer 102 may be made for example of indium tin oxide, ITO, which is a transparent and colorless conducting oxide.

For example, the capacitance sensor 101 may be a self-capacitance sensor or an in-cell capacitance sensor, or combination of those. Capacitive sensing is a technology that is based on capacitive coupling that may take human body capacitance as an input. Capacitive sensors may detect various things that are conductive or have a dielectric different from that of air. Many types of sensors use capacitance sensing, including sensors to detect and measure proximity, position or displacement. Human interface devices based on capacitive sensing, such as trackpads, can for example replace the computer mouse. Devices may also use capacitive sensing touchscreens as input devices. Capacitive sensors can further replace mechanical buttons.

According to an example, the self-capacitive sensor may be based on an X-Y matrix of micro-fine capacitors, which is embedded for example within a laminated glass substrate. With self-capacitance, the capacitive load of a finger on each column or row of the matrix may be detected. It can use frequency modulation to detect minute capacitance changes within the conductive tracks.

According to an example, with the in-cell capacitance sensor technology some layers may be eliminated by building the capacitors inside the display 100 itself. For example, the in-cell electrodes may be deposited on a glass layer inside a LCD panel. A digitizer can be used for touch sensitivity, while the LCD screen displays the on-screen images. The in-cell capacitance sensor display technology combines these layers into a single layer, allowing thinner and lighter devices.

Figure 2:
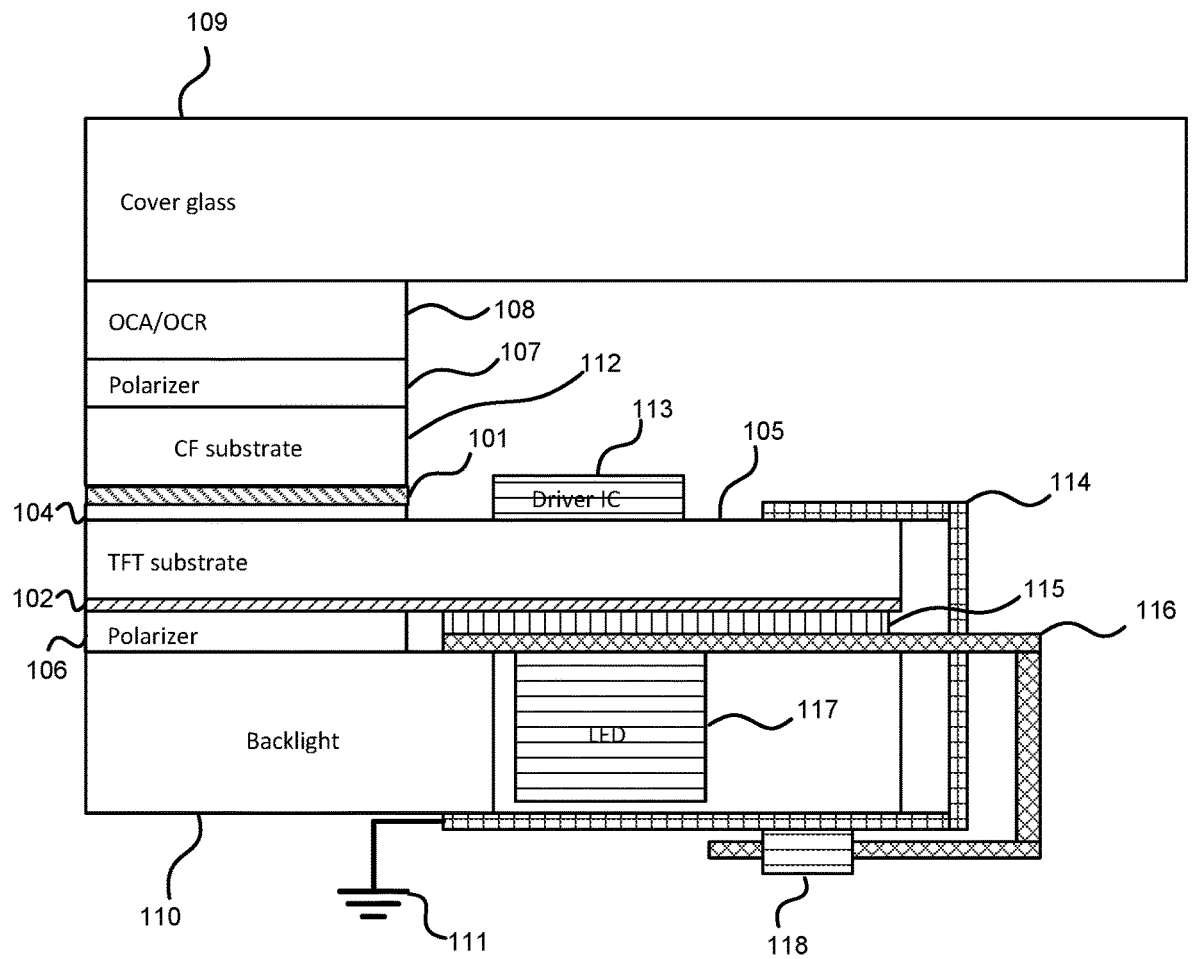
FIG. 2 illustrates a cross section of a schematic representation of a structure of a touch sensitive display including grounding through a conductor according to an illustrative example.
Figure 3:
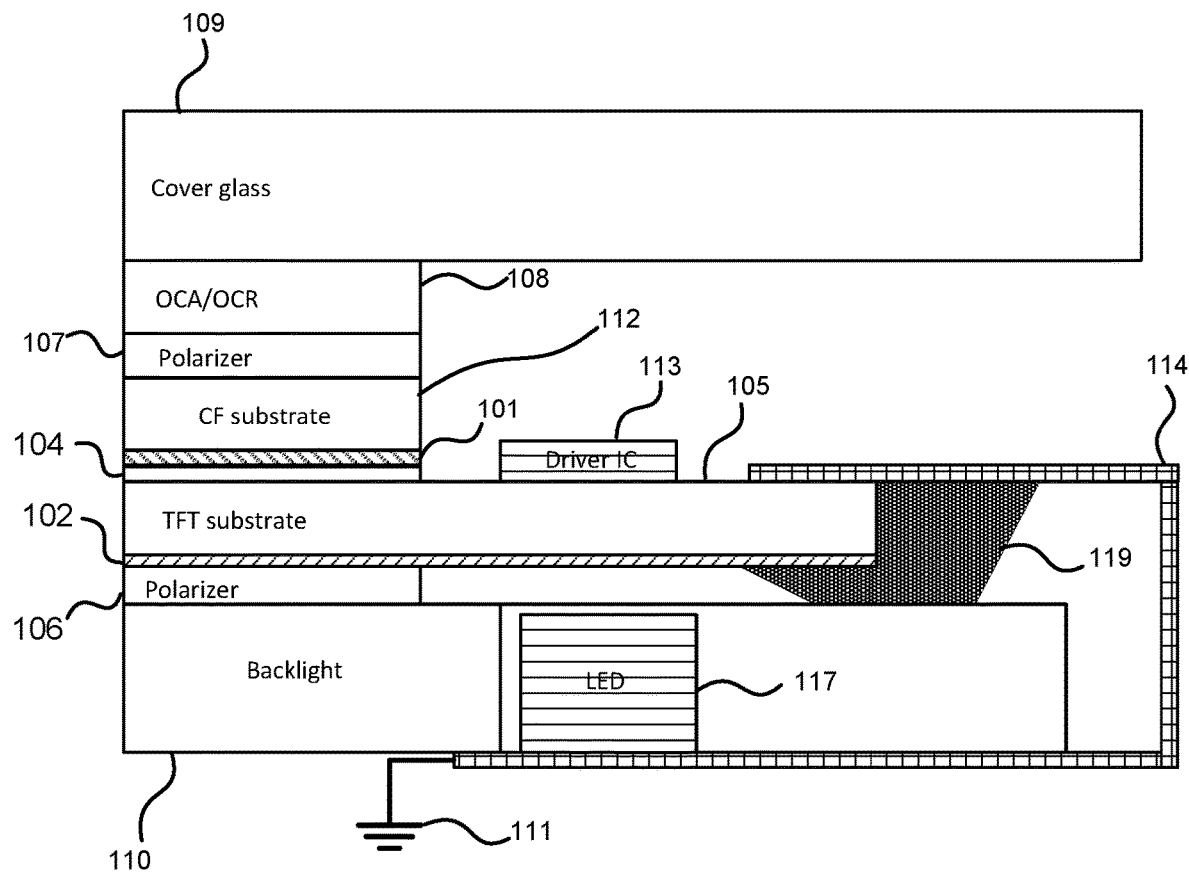
FIG. 3 illustrates a cross section of a schematic representation of a structure of a touch sensitive display including grounding through Ag paste according to another illustrative example.
Figure 4:
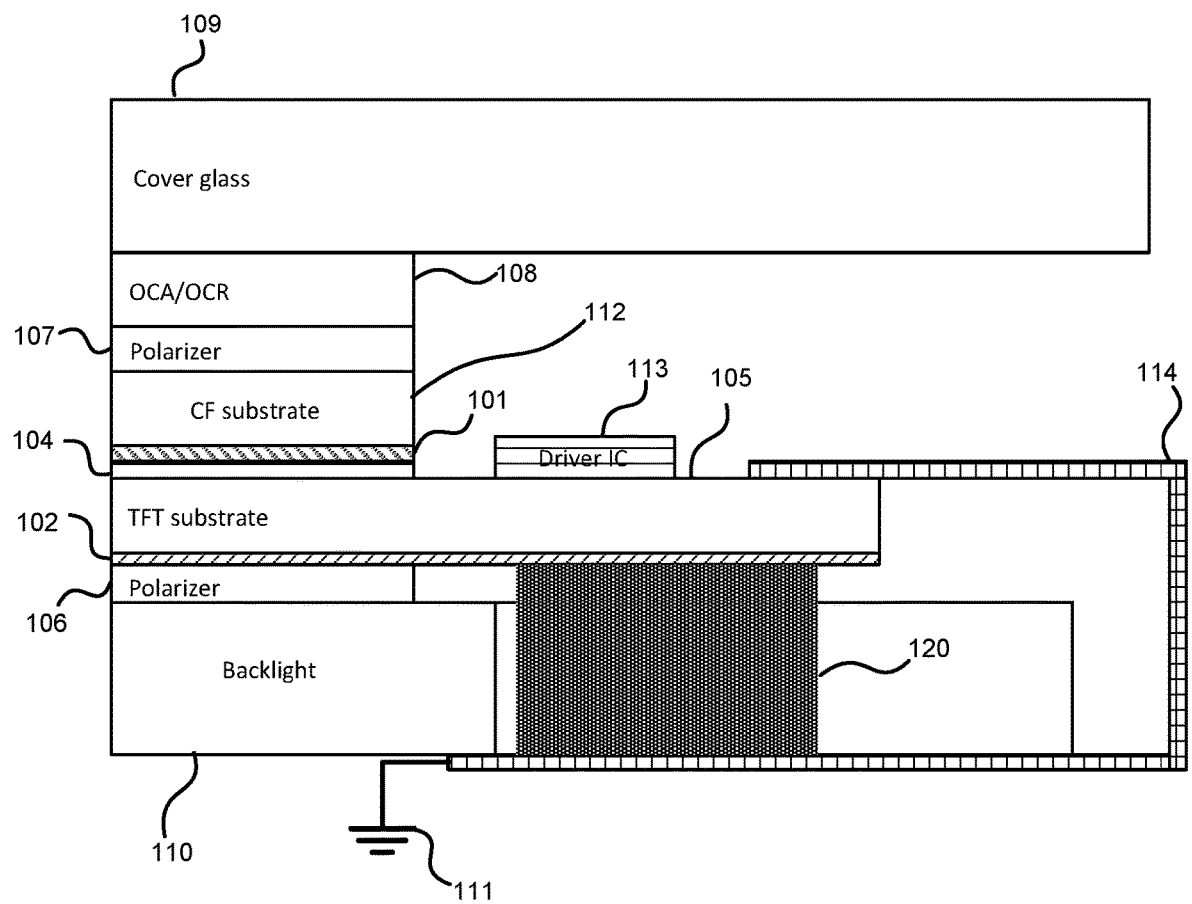
FIG. 4 illustrates a cross section of a schematic representation of a structure of a touch sensitive display including grounding through a sponge according to another illustrative example.

FIGS. 2-4 illustrate examples wherein the conductive grounded layer 102 is placed under the TFT substrate 105, and the layer 102 is galvanically connected to the main ground 111 of the display device. This can be accomplished in several ways, for example using cover layer openings as illustrated in the example of FIG. 2, a conductive paste as illustrated in the example of FIG. 3, and a conductive sponge as illustrated in the example of FIG. 4.

FIG. 2 illustrates an example of a structure that is configured to galvanically connect a conductive grounded layer 102 to a main ground 111. In the example of FIG. 2, the conductive grounded layer 102 is connected to a flexible printed circuit conductor 116 via a conductive adhesive layer 115. The flexible printed circuit conductor 116 may be connected to a LED 117. The conductive adhesive is connected to cover layer openings on the conductor 116. The flexible printed circuit conductor 116 includes a galvanic connection 118, made for example by soldering the flexible printed circuit conductor 116 to a main flexible printed circuit conductor 114. The main conductor 114 is connected to the main ground 111. Consequently, the conductive grounded layer 102 is galvanically connected and grounded to the main ground 111.

FIG. 3 illustrates another example of a structure that is configured to galvanically connect a conductive grounded layer 102 to a main ground 111. In the example of FIG. 3, a main flexible printed circuit conductor 114 is connected to the main ground 111. A conductive paste 119 connects the conductive grounded layer 102 to the main flexible printed circuit conductor 114. For example, Ag paste may be used to connect the layer 102 to the conductor 114. Consequently, the conductive grounded layer 102 is galvanically connected and grounded to the main ground 111.

FIG. 4 illustrates another example of a structure which is configured to galvanically connect a conductive grounded layer 102 to a main ground 111. In the example of FIG. 4, the conductive grounded layer 102 is connected to a main flexible printed circuit conductor 114 through a conductive sponge 120. The conductive sponge 120 may be connected to openings of the cover layer of the conductor 114. Consequently, the grounded layer 102 is galvanically connected to the main ground 111.

Figure 5:
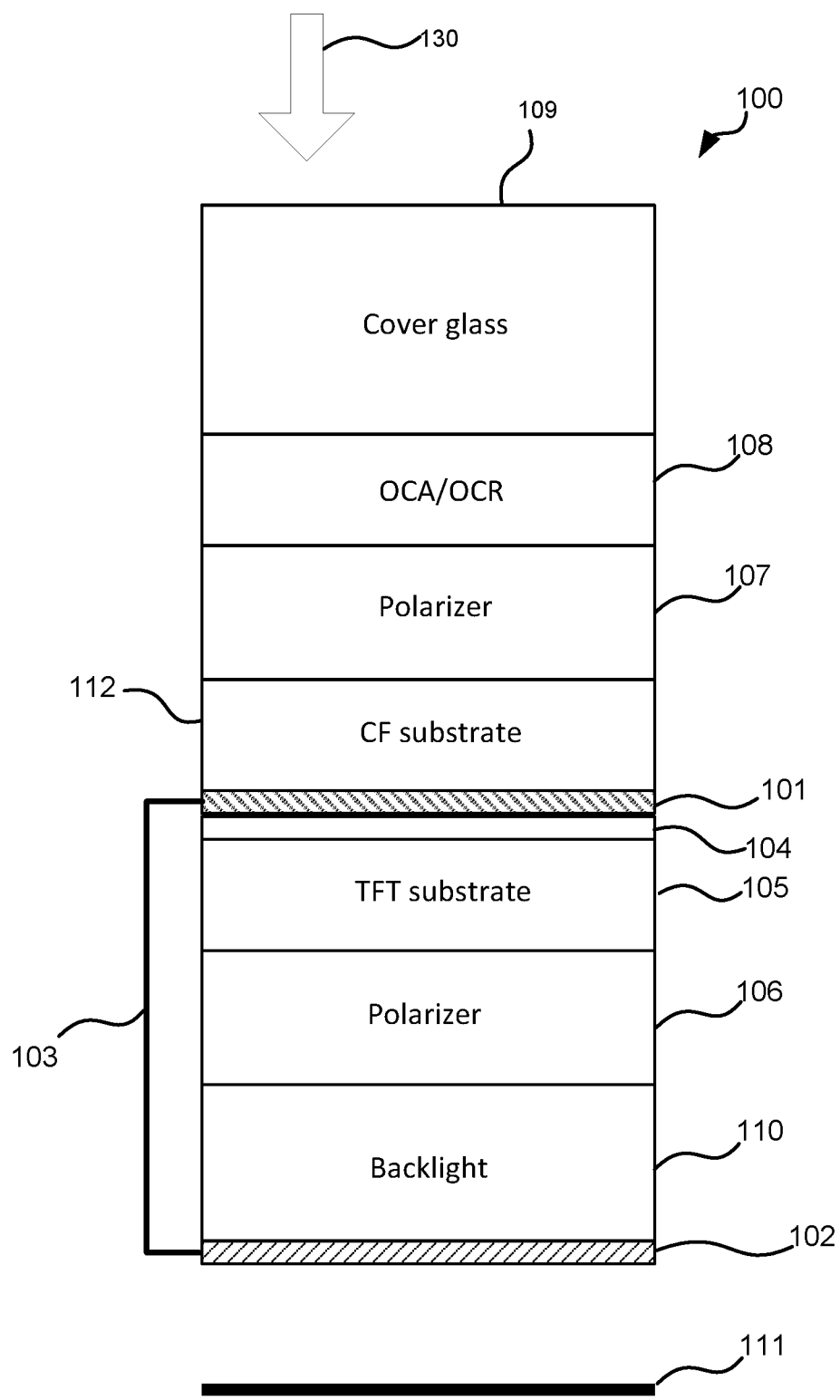
FIG. 5 illustrates a cross section of a schematic representation of a touch sensitive display having a grounded layer at the bottom of the stack according to another illustrative example.

The conductive grounded layer 102 may be placed further away than what is illustrated in the example of FIG. 1, for example to the backside of the display 100 as illustrated in FIG. 5. FIG. 5 illustrates another example of the touch sensitive display 100. In the example of FIG. 5, the conductive grounded layer 102 is configured on the backside of the display 100. For example, the conductive grounded layer 102 may be configured under the backlight 110. The distance 103 between the capacitance sensor 101 and the grounded layer 102 is illustrated in FIG. 5. Although there are more layers between the capacitance sensor 101 and the conductive grounded layer 102 than in the example of FIG. 1, the distance 103 remains stable, when the capacitive sensor 102 and the conductive grounded layer 102 are displaced. The distance 103 thus remains stable, when the touch sensitive display 100 and the respective device are being used. The distance 103 is configured to be generally constant. Both layers 101,102 may be displaced simultaneously, along with all the layers of the display 100, whereby the distance 103 remains stable and constant. The capacitive sensor 101 can have a capacitive connection via the conductive grounded layer 102, instead of having a capacitive connection directly to the main ground 111.

According to an example, the conductive grounded layer 102 may be non-transparent if it is placed under the backlight 110 or if the display system is an Organic Light Emitting Diode, OLED.

Figure 6:
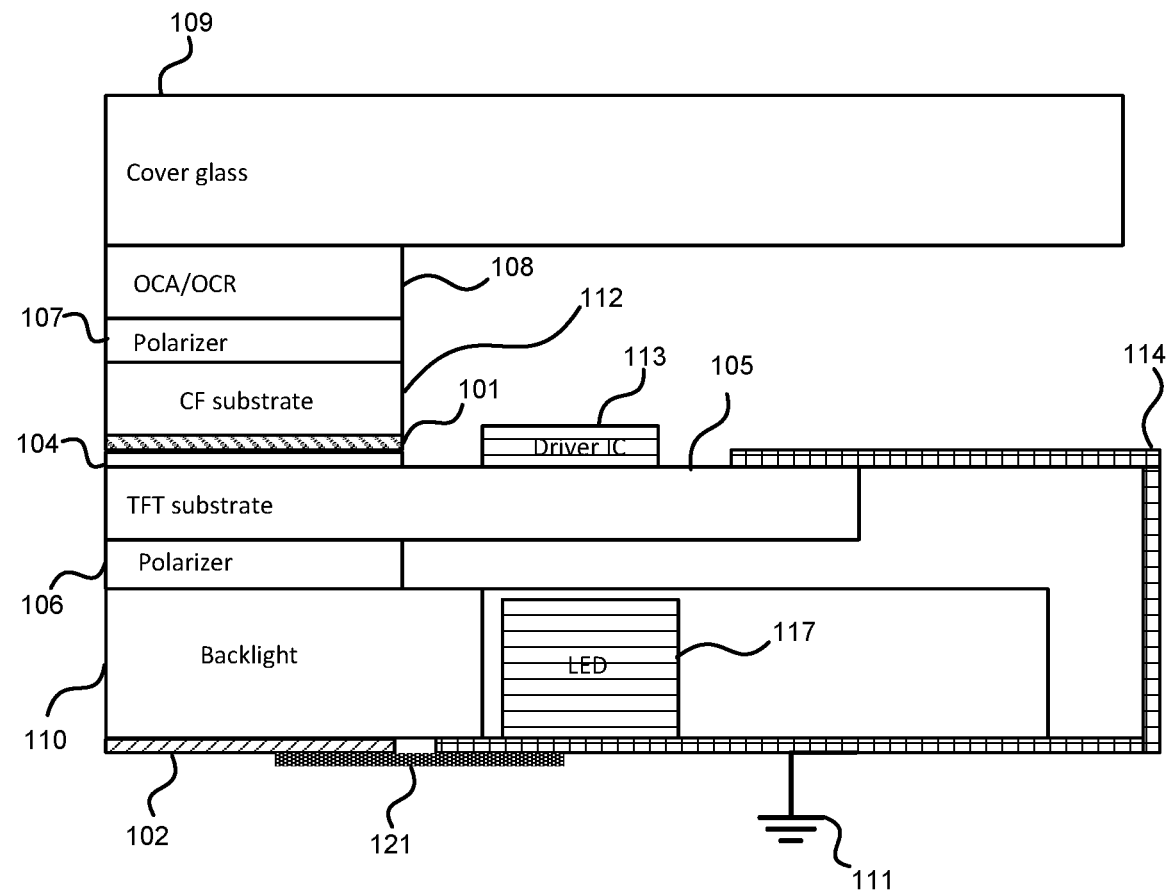
FIG. 6 illustrates a cross section of a schematic representation of a structure of a touch sensitive display having grounding through conductive adhesive according to another illustrative example.
Figure 7:
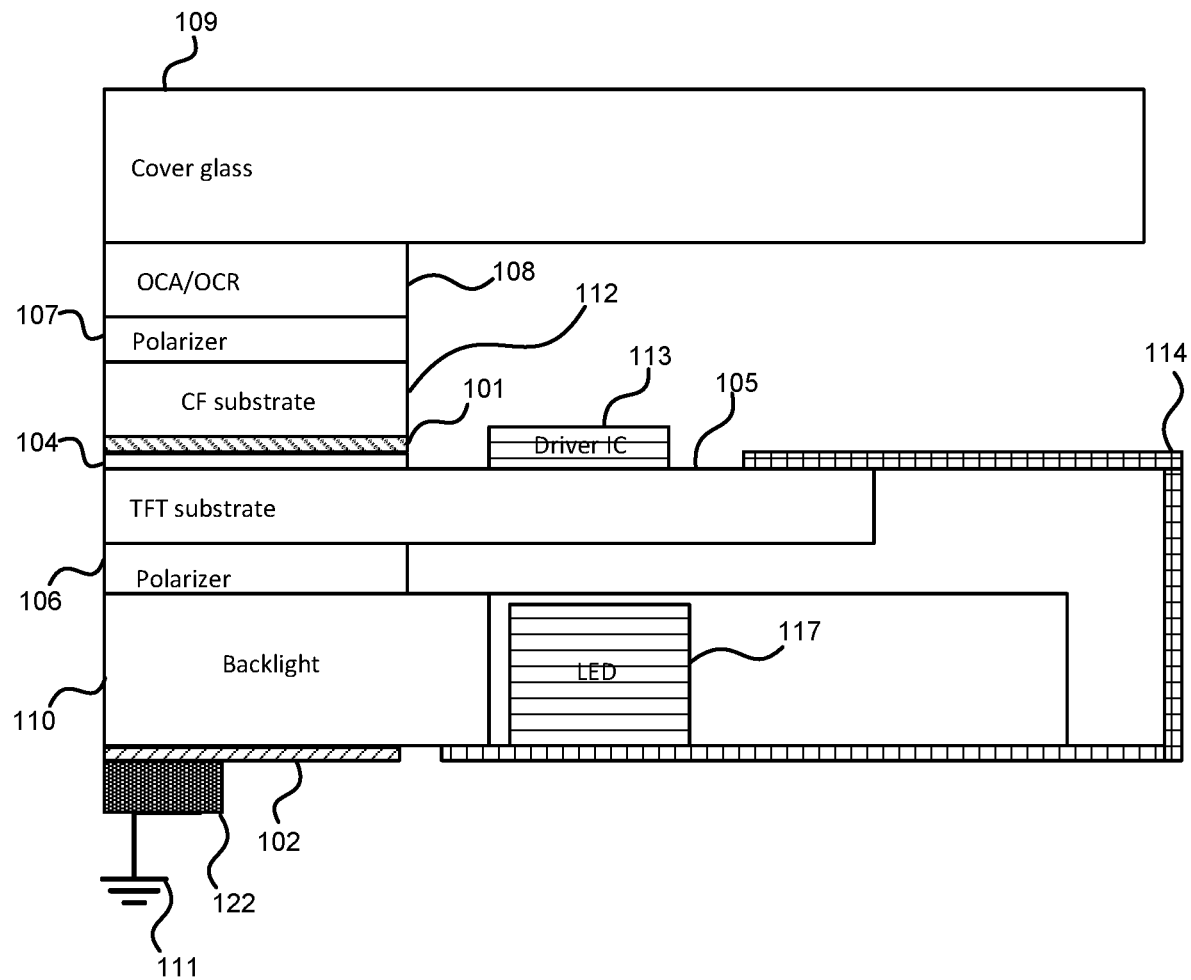
FIG. 7 illustrates a cross section of a schematic representation of a structure of a touch sensitive display having grounding through a conductive sponge according to another illustrative example.

FIGS. 6 and 7 illustrate examples wherein the conductive grounded layer 102 is placed under the backlight 110, and the layer 102 is galvanically connected to the main ground 111 of the device. There may be several examples for this, for example using conductive taping as illustrated in FIG. 6 or a conductive sponge as illustrated in FIG. 7. According to another example, the layer under the backlight 110 may also be of a conductive sponge type and may be directly connected to the main ground 111.

FIG. 6 illustrates an example of a structure wherein a conductive grounded layer 102 is galvanically connected to a main ground 111. The conductive grounded layer 102 is situated under a backlight 110. A layer of conductive adhesive 121 connects the conductive grounded layer 102 to a main flexible printed circuit conductor 114. The layer of conductive adhesive 121 may be under the grounded layer 102 and the conductor 114. The conductor 114 is connected to the main ground 111, and consequently the grounded layer 102 is galvanically connected to the main ground 111.

FIG. 7 illustrates an example of a structure wherein a conductive grounded layer 102 is galvanically connected to a main ground 111. In the example of FIG. 7, the conductive grounded layer 102 is situated under a backlight 110. A conductive sponge 122 connects the grounded layer 102 to the main ground 111. A main flexible printed circuit conductor 114 is shown in the example of FIG. 7; however, it is not needed for the galvanic grounding in the example, as the grounded layer 102 is connected to the main ground 111 by a direct instrument between them.

Figure 8:
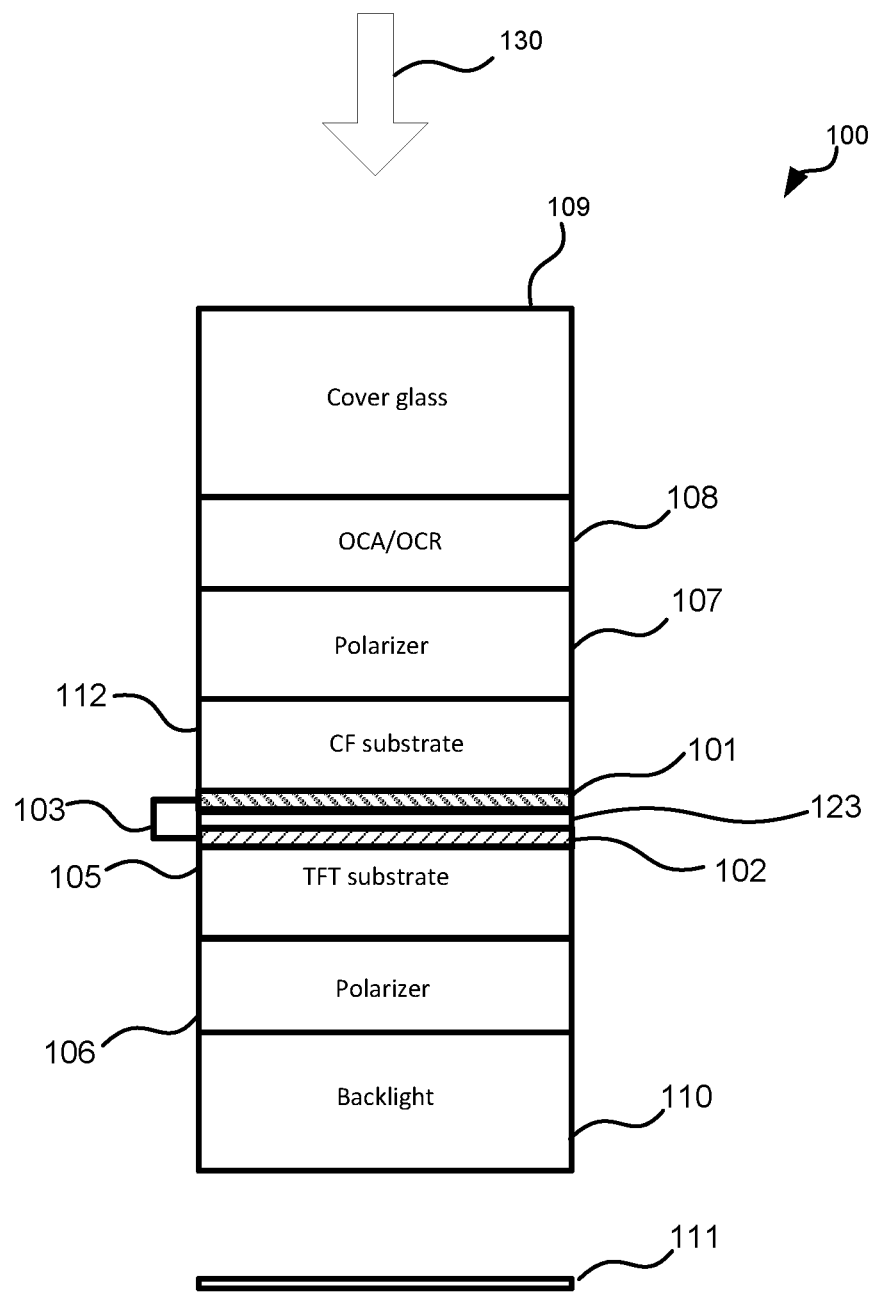
FIG. 8 illustrates a cross section of a schematic representation of a touch sensitive display having a grounded layer above a TFT substrate according to another illustrative example.

FIG. 8 illustrates another example of the touch sensitive display 100. In the example of FIG. 8, the conductive grounded layer 102 is configured above the TFT substrate 105. An intermediate layer 123 may be configured between the conductive grounded layer 102 and the capacitive sensor 101. For example, a layer of TFT glass 104 may be manufactured between the layer 102 and the sensor 101.

Figure 9:
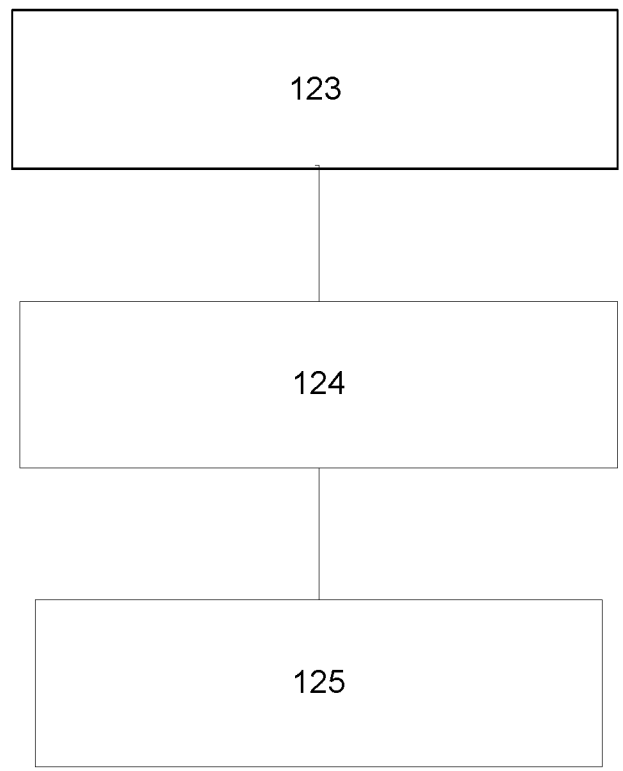
FIG. 9 illustrates a diagrammatic representation of a method for manufacturing a touch sensitive display according to an example.

FIG. 9 illustrates an example of a method for manufacturing a touch sensitive display 100. The display may be similar to any of the examples of the displays discussed above. An example of the method may also be performed in alternative steps, or order as described below. In step 123, a layer of a capacitance sensor 101 is placed between layers of the display 100 of the device. For example, the capacitance sensor 101 may be placed above a TFT substrate 105 and under a CF substrate 112. In step 124, a layer of a conductive ground element 102 is placed under the layer of the capacitance sensor 101 in a direction opposite to a targeted sensing direction of the touch sensitive display device. For example, the grounded layer 102 may be placed under the TFT substrate 105, possibly even as far as under the backlight 110. In step 125, the distance between the layer of the capacitance sensor 101 and the layer of the conductive grounded element 102 is configured stable. The distance remains constant when the device is used or when the layers are displaced. According to an example, the display 100 can be integrated into the device. According to another example, the display 100 can be made interoperable with the device. In this case, the device may not require a specific interoperability software algorithm, as the display 100 is interoperable with the device after the manufacturing process.

While examples have been discussed in the form of a device such as a smartphone, as discussed, other bendable and non-bendable computing devices may be used equivalently, such as tablet computers, netbook computers, laptop computers, desktop computers, processor-enabled televisions, personal digital assistants (PDAs), touchscreen devices connected to a video game console or set-top box, or any other computing device that has a gesture sensitive display unit and is enabled to apply it.

The term 'computer', 'computing-based device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The manufacturing methods and functionalities described herein may be operated by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

According to the above, some examples are directed to a device, comprising: a capacitance sensor layer; and a conductive grounded layer, wherein the conductive grounded layer is placed under the capacitance sensor layer in a direction opposite to a targeted sensing direction of the device; wherein a distance between the capacitance sensor layer and the conductive grounded layer is configured to remain within a threshold over a range of deformation. Additionally or alternatively to one or more of the examples, the distance is configured stable when at least one of the layers is displaced or bent. Additionally or alternatively to one or more of the examples, the distance is configured constant when both layers are displaced. Additionally or alternatively to one or more of the examples, including a display comprising two or more layers, wherein the capacitance sensor layer is configured between the layers of the display. Additionally or alternatively to one or more of the examples, the device comprises a touch sensitive display device, and at least one of the layers is displaced by touch on the touch sensitive display device, wherein the touch is directed in the targeted sensing direction. Additionally or alternatively to one or more of the examples, the device comprises a bendable touch sensitive display device. Additionally or alternatively to one or more of the examples, the capacitance sensor layer is configured to capacitively detect touch on a surface of the device. Additionally or alternatively to one or more of the examples, the capacitance sensor layer comprises a self-capacitance sensor layer or an absolute capacitance sensing layer. Additionally or alternatively to one or more of the examples, the capacitance sensor layer comprises an in-cell capacitance sensor layer. Additionally or alternatively to one or more of the examples, the conductive grounded layer is galvanically connected to a main ground of the device. Additionally or alternatively to one or more of the examples, the conductive grounded layer is placed under a thin film transistor, TFT, layer, and the capacitance sensor layer is placed above the TFT layer. Additionally or alternatively to one or more of the examples, the conductive grounded layer is placed above a backlight of the display device. Additionally or alternatively to one or more of the examples, the conductive grounded layer is transparent. Additionally or alternatively to one or more of the examples, further including: a first flexible conductor, which is connected to a main ground of the device; and a second flexible conductor, which is connected to the conductive grounded layer and to the first flexible conductor, wherein the second flexible conductor is connected to the conductive grounded layer by a layer of conductive adhesive. Additionally or alternatively to one or more of the examples, further including a flexible conductor, which is connected to a main ground of the device, wherein the conductive grounded layer is connected to the flexible connector by a conductive paste, by a conductive sponge, or by a conductive adhesive. Additionally or alternatively to one or more of the examples, the conductive grounded layer is placed under a backlight of the device. Additionally or alternatively to one or more of the examples, the conductive grounded layer is non-transparent. Additionally or alternatively to one or more of the examples, the conductive grounded layer is directly connected to a main ground of the device through a conductive sponge.

Some examples are directed to a method for manufacturing a device, comprising: placing a layer of a capacitance sensor between layers of a display of the device; and placing a layer of a conductive ground element under the layer of the capacitance sensor in a direction opposite to a targeted sensing direction of the device; wherein a distance between the layer of the capacitance sensor and the layer of the conductive grounded element is configured to remain within a threshold over a range of deformation.

Some examples are directed to a touch sensitive display module, comprising: a capacitance sensor element; and a conductive grounded element, wherein the conductive grounded element is placed under the capacitance sensor element in a direction opposite to a targeted sensing direction of the touch sensitive display module; wherein a distance between the capacitance sensor element and the conductive grounded element is configured generally constant.

It will be understood that the above description is given by way of example only and that various modifications may be made by those skilled in the art. The above specification, examples and data provide a complete description of the structure and use of exemplary embodiments. Although various examples have been described above with a certain degree of particularity, or with reference to one or more individual examples, those skilled in the art could make numerous alterations to the disclosed examples without departing from the spirit or scope of this specification.

The invention claimed is:

1. A device, comprising:
a capacitance sensor layer;
a backlight;
a conductive grounded layer that is placed under the capacitance sensor layer in a direction opposite to a targeted sensing direction of the device; and
a flexible conductor connected at one portion to a main ground and connected at another portion to a conductive intermediary material, the conductive intermediary material spanning across the backlight and touching both the flexible conductor and the conductive grounded layer.

2. The device of claim 1, wherein the conductive intermediary material comprises a conductive paste or a conductive adhesive.

3. The device of claim 1, wherein the conductive paste comprises silver.

4. The device of claim 1, wherein the distance remains stable upon at least one of the layers being displaced or bent.

5. The device of claim 1, wherein the distance remains constant upon both layers being displaced.

6. The device of claim 1, including a display comprising two or more layers, wherein the capacitance sensor layer is configured between the layers of the display.

7. The device of claim 1, wherein the device comprises a bendable touch sensitive display device.

8. The device of claim 1, wherein the capacitance sensor layer is configured to capacitively detect touch on a surface of the device.

9. The device of claim 1, wherein the capacitance sensor layer comprises a self-capacitance sensor layer or an absolute capacitance sensing layer.

10. The device of claim 1, wherein the conductive grounded layer is transparent.

11. The device of claim 1, wherein the capacitance sensor layer comprises an in-cell capacitance sensor layer.

12. The device of claim 1, wherein the conductive grounded layer is placed above a backlight of the display device.

13. A device, comprising:
a capacitance sensor layer;
a conductive grounded layer;
a backlight;
a flexible conductor connected to a main ground; and
a conductive intermediary material spanning across the backlight and connected to and touching both the flexible conductor and the conductive grounded layer.

14. The device of claim 13, wherein the conductive grounded layer comprises a cover layer with one or more openings.

15. The device of claim 14, wherein the conductive intermediary material comprises a conductive sponge that is connected to the conductive grounded layer through the one or more openings of the cover layer.

16. The device of claim 13, further comprising a polarizer positioned in between the main ground and the conductive grounded layer.

17. The device of claim 13, further comprising a backlight positioned in between the main ground and the conductive grounded layer.

18. The device of claim 13, further comprising an LED positioned in between the main ground and the conductive grounded layer.

19. A method for manufacturing a device, comprising:
placing a capacitance sensor layer between layers of a display of the device;
placing a conductive grounded layer under the layer of the capacitance sensor;
connecting a flexible conductor to a main ground; and
spanning a conductive intermediary material across a backlight and into contact with the flexible conductor and the conductive grounded layer.

20. The method of claim 19, wherein a distance between the capacitance sensor layer and the conductive grounded layer is configured to remain within a threshold as the capacitance sensor layer and the conductive grounded layer flex between initial and deformed positions upon application of force from one or more external touches.

* * * * *